United States Patent [19]
Dunn

[11] 3,770,332
[45] Nov. 6, 1973

[54] COMPOSITE HEAVY-DUTY BUSHING AND METHOD OF MAKING THE SAME

[75] Inventor: William M. Dunn, Farmington, Mich.

[73] Assignee: Federal-Mogul Corporation, Southfield, Mich.

[22] Filed: June 14, 1971

[21] Appl. No.: 152,860

[52] U.S. Cl. ............................ 308/237 R, 29/182.2
[51] Int. Cl. ....................... F16c 33/12, F16c 33/14
[58] Field of Search .................... 308/237, DIG. 8; 29/182.2; 75/208

[56] References Cited
UNITED STATES PATENTS

| | | | |
|---|---|---|---|
| 2,747,256 | 5/1956 | Wyatt et al. | 75/226 |
| 2,815,567 | 12/1957 | Gould et al. | 75/226 |
| 3,672,881 | 6/1972 | Sowko | 29/182.2 |
| 2,121,448 | 6/1938 | Ritzau | 29/182.2 |
| 2,299,192 | 10/1942 | Tormyn | 308/237 |
| 2,664,326 | 12/1953 | Kuzmick | 308/237 |
| 3,285,680 | 11/1966 | Dailey | 308/237 |
| 3,418,028 | 12/1968 | Watson et al. | 308/DIG. 8 |
| 3,359,047 | 12/1967 | Andersen | 308/237 |

FOREIGN PATENTS OR APPLICATIONS

| | | | |
|---|---|---|---|
| 671,543 | 5/1952 | Great Britain | 29/182.2 |

OTHER PUBLICATIONS

Geschelin, "Powder Metallurgy," Automotive and Aviation Industries, June 1, 1942, Pg. 28 et seq.

*Primary Examiner*—Charles J. Myhre
*Assistant Examiner*—Barry Grossman
*Attorney*—Barthel & Bugbee

[57] ABSTRACT

A composite heavy-duty bushing, such as a bearing bushing or bearing race (FIG. 4) consists of a high load-bearing or working portion consisting of a sleeve composed of sintered powdered high-performance alloy and a supporting or mounting sleeve subjected to less concentrated or intense loads made of an inexpensive base metal, such as sintered powdered iron. These two sleeves are separately briquetted, and then assembled telescopically. This assembly is then sintered while the sleeves are thus united, and finally hot-forged in an axial direction. This forging operation densifies the composite assembly from the sintered briquette density of about 75 percent to a final density of about 98 percent and at the same time upsets the ends of the base metal sleeve into an adjacent end bevel in the high performance alloy sleeve, hereby clinching the two sleeves inseparably to one another. Photomicrographs of longitudinal sections of these composite bushings spanning the joint between the two sleeves (FIG. 6) after subsequent carburizing and hardening heat treatment show a superior interlock therebetween resulting from a migration of the metals into one another across the interface therebetween into an intermediate zone of the intermingled metals which encircles the interphase. Torsion tests performed on such sections show adequate strengths without failure along the junction surfaces which compare favorably with the strength of similar single solid metal bushings. These photomicrographs also show that such a complete bond has been achieved along the central or axial portion of the joint, that the beveling of the ends is not essential in order to form a joint of adequate strength. Such beveling at the ends is therefore optional and is provided as an additional means of retention of the inner sleeve inside the outer sleeve.

4 Claims, 7 Drawing Figures

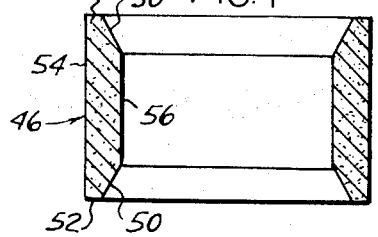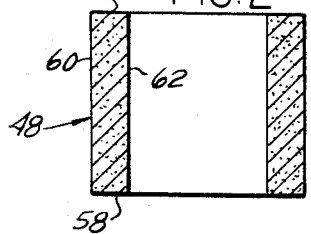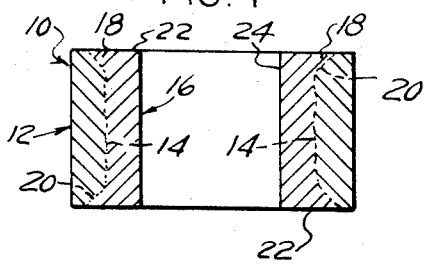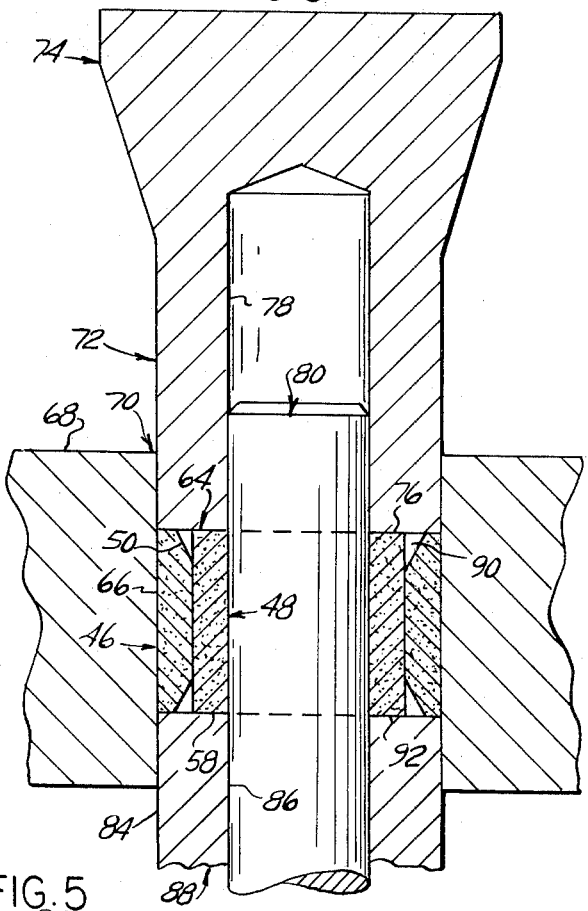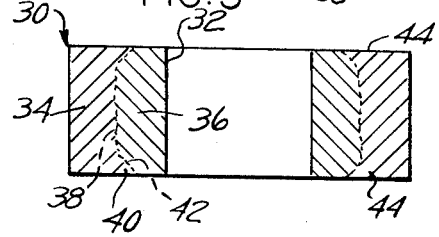

INVENTOR
WILLIAM M. DUNI
BY Barthel & Bugbee
ATTORNEYS

COMPOSITE HEAVY-DUTY BUSHING AND METHOD OF MAKING THE SAME

SUMMARY OF THE INVENTION

The invention particularly resides in the composite heavy-duty bushing consisting of a sintered powdered high performance alloy sleeve forged at high temperature to a sintered powdered base metal sleeve so as to provide a migration of the metals into one another across the interface therebetween into an intermediate zone of the intermingled metals which encircles the interface.

In the drawings,

FIG. 1 is a longitudinal section through the outer powdered metal sleeve of the present composite bushing, after briquetting but before sintering, according to one form of the invention;

FIG. 2 is a similar longitudinal section through the inner powdered metal sleeve of the present composite bushing, after briquetting but before sintering, according to the same form of the invention;

FIG. 3 is a longitudinal section through a hot-forging die in a hot-forging press, showing the outer and inner sleeves of FIGS. 1 and 2 after they have been assembled telescopically and sintered simultaneously, at the start of the hot-forging operation of uniting them into a composite bushing;

FIG. 4 is a longitudinal section through the composite bushing, after forging;

FIG. 5 is a view similar to FIG. 4 but with the outer and inner sleeve portions reversed, so that the inner sleeve is composed of high performance alloy and the outer sleeve of base metal;

FIG. 6 is a flow diagram of the steps involved in the method of making the composite bushing of FIG. 4.

Figure 7:
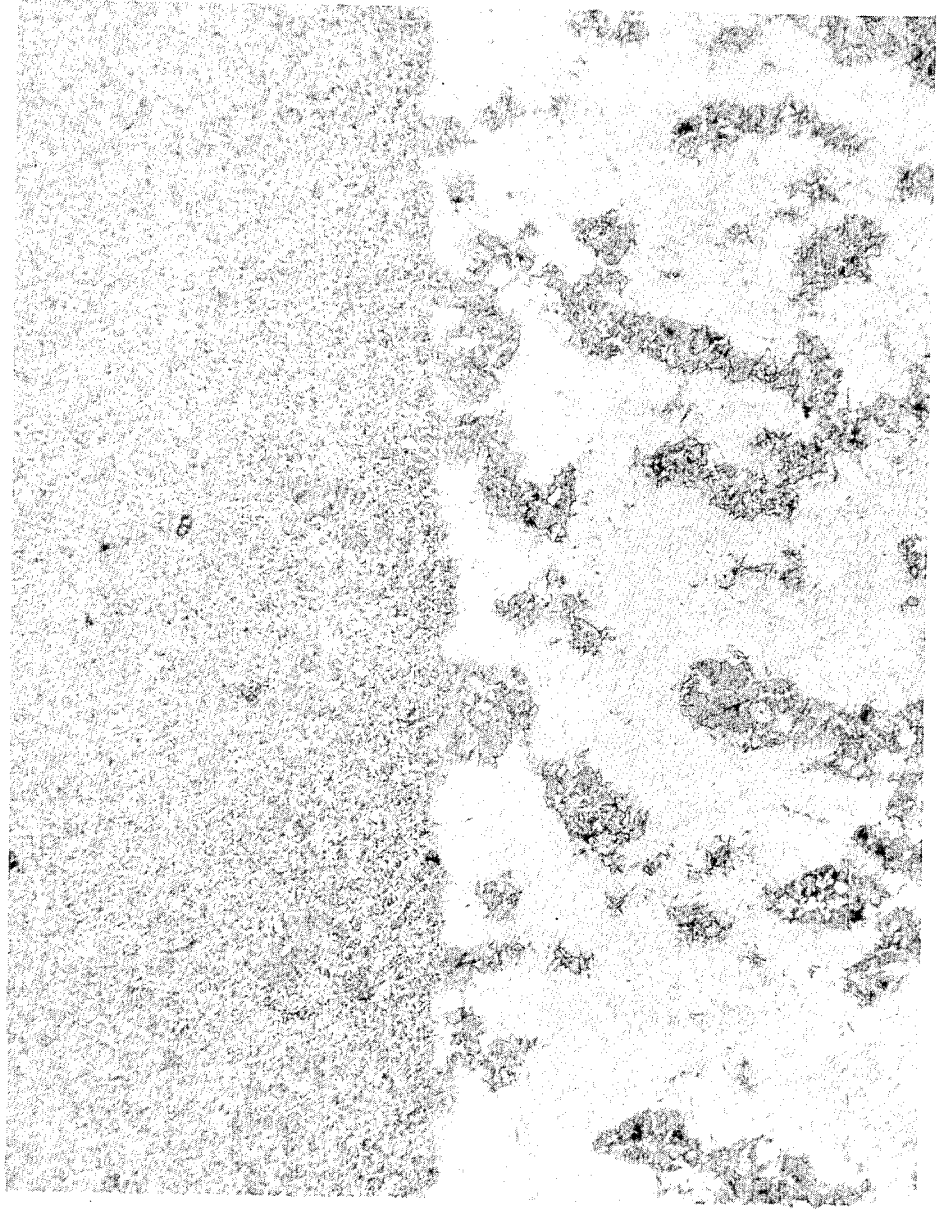
FIG. 7 is a photomicrograph of a longitudinal section of the composite bushing of FIG. 4, showing the interlocking and interflow of the different metals at the interface.

Referring to the drawings in detail, FIG. 4 shows a composite heavy-duty bushing, generally designated 10, according to one form of the invention, as composed of a high performance alloy outer sleeve 12 joined at a generally cylindrical interface indicated by the dotted line 14 to a base metal inner sleeve 16, with opposite end portions 18 of the base metal sleeve 16 expanded into engagement with internal bevels 20 in the outer sleeve 12. The composite bushing 10 has flat annular opposite end surfaces and an internal bore 24. Where the outer sleeve 12 of the composite bushing 10 is to constitute the heavy-duty load-bearing component (FIG. 4), it is formed from high-performance alloy powder, such as of the composition set forth below, whereas the less intense load-bearing inner sleeve 16 is suitably formed from powdered iron, thereby producing a composite heavy-duty bushing 10 suitable, for example, for the inner race of a roller bearing.

On the other hand, if the composite heavy duty bushing is to be a bearing bushing 30 for rotatably supporting a shaft in its bore 32, or the outer race of a roller bearing, the inner sleeve 36 is composed of the high performance alloy and the outer sleeve 34 of the powdered iron (FIG. 5), with a similar generally cylindrical interface 38 having opposite end portions 40 expanded inward against external bevels 42 at the opposite ends of the inner high performance alloy sleeve portion 36.

The composite bushing 30 of FIG. 5 has flat annular opposite end surfaces 44.

The sleeves 12 and 16 are formed from powdered metal briquettes 46 and 48 (FIGS. 1 and 2) which are formed by briquetting suitable high performance alloy powder and iron powder respectively in the correspondingly-shaped die cavities of conventional briquetting presses (not shown), the said die cavities being formed between a die with a cylindrical die bore, a cylindrical core rod, and upper and lower punches, by briquetting procedures well known to those skilled in the powder metallurgy art. The upper and lower punches of the briquetting press used for producing the outer high performance alloy sleeve 46 have bevels on the ends thereof adapted to produce corresponding end bevels 50 which extend axially toward one another from the flat end portions 52 (FIG. 1). The cylindrical bore of the briquetting press die forms the outer cylindrical surface 54 of the briquette 46 whereas the core rod thereof forms the cylindrical inner surface 56. The die for briquetting the inner sleeve 48, on the other hand, has upper and lower tubular punches with flat ends producing the flat upper and lower ends 58 of the inner sleeve briquette 48 whereas the cylindrical die bore and cylindrical core rod produce the cylindrical outer and inner surfaces 60 and 62 thereof respectively. The outer sleeve briquette 46 is formed (FIG. 6) by briquetting a powder of a suitable high performance metal or metal alloy, for example the so-called S.A.E. 4600 alloy powder. The inner sleeve briquette 48, on the other hand, by not requiring the heavy load-sustaining properties of the outer portion 12 of the composite bushing 10, is formed from iron powder.

The briquettes 46 and 48 are next assembled in telescoped relationship (FIG. 6) and sintered in a conventional sintering oven at the customary temperatures, thereby forming a sintered composite sleeve 64 (FIG. 3). The composite sintered powdered metal sleeve 64 is then heated to a temperature preferably between 1,500° and 2,100° F. and placed in the cylindrical bore 66 of the die plate 68 of a die set 70 mounted in a conventional hot forging press 72 (FIG. 3). The die set 70 includes the die plate 68 containing the cylindrical die bore 66, an upper tubular punch 74 with a cylindrical outer surface 76 telescoping with the die bore 66 and having a flat annular lower end face 78 surrounding a bore 80 telescoping with a cylindrical core rod 82. Also telescoping with the die bore 66 and core rod 80 are the outer and inner cylindrical surfaces 84 and 86 of a lower tubular punch 88.

In the carrying out of the method (FIG. 6) of making the composite heavy duty bushing 10 of FIG. 4, the upper punch 74 is retracted upward, whereupon the composite sintered powdered metal bushing 64 having a density of approximately 75 percent in its heated condition is placed within the die cavity 90 formed between the die bore 66, the core rod 80, and the upper and lower tubular punches 74 and 88, resting upon the annular upper end surface 92 of the lower tubular punch 88. The upper punch 72 is then moved downward into the die bore 66 and its lower end surface 76 caused to exert heavy deforming pressure upon the composite sintered powdered metal bushing 64. The upper end surface 92 of the lower tubular punch 88 acts as an anvil while the cylindrical surfaces 66 and 86 of the die plate 68 and core rod 80 prevent lateral flow of the metal. As a result, this hot forging operation (FIG. 6) is carried out with sufficient force to compress the composite sintered powdered metal bushing 64 axially while at the same time causing its opposite ends 58 of its inner component 48 to be upset and expanded outward into the space provided by the bevel 50 on the outer component 46. At the same time, the hot forging temperature pressure raises the density of the sintered powdered metal composite bushing 64 from approximately 75 percent to about 98 percent, so that it becomes substantially solid metal and presents the final appearance shown in FIG. 4. The forging pressure combined with the heat of forging, results in an excellent and continuous hot-forged junction at the interface 14 between the cylindrical surfaces 56 and 62 of the outer and inner sleeves 46 and 48 and produces a migration of the metals of the outer and inner portions, now 12 and 16, caused by the forced metallic flow, resulting from the forging heat and pressure, across the interface 14 into an intermediate zone of intermingled metals which encircle the interface 14. This results in an inseparable and continuous interlocking thereof along the interface 14, as shown by the photomicrograph (FIG. 7), wherein the light-colored portion is the heavy-duty alloy and the dark-colored portions are the iron.

The production of the composite heavy duty bushing 30 of FIG. 5 follows the same procedure as has been described above for the composite bushing 10 of FIG. 4, except that the heavy duty alloy sleeve 36 is now inside and the low performance metal sleeve 34 is on the outside. The method constituting the separate briquetting of the inner and outer sleeves 36 and 34, their assembling telescopically, their sintering in assembled relationship and their forging also follows the procedure set forth in the flow chart shown in FIG. 6. In forging, as before, the metal at the opposite ends flows laterally against the bevels 42, thereby upsetting the opposite ends and clinching the bushings into an inseparable condition. It will of course be understood that the word "iron" as used herein includes iron having carbon therein for imparting the desired hardness as achieved by conventional heat treatment. It also includes conventional carburization of the iron for providing a hardened external surface.

The above-mentioned nickel-content S.A.E. 4600 iron alloy powder has the following composition:

| manganese | 0.20% ) | |
|---|---|---|
| nickel | 1.75% ) | with the remainder iron, plus carbon to suit. |
| molybdenum | 0.25% ) | |

The nickel-free high-performance iron alloy powder also mentioned above has the following composition:

| manganese | 0.48% ) | with the remainder iron, plus |
|---|---|---|
| nickel | none% ) | high carbon 0.59% or low |
| molybdenum | 0.59% ) | carbon 0.28%. |

Heat treatment of the composite bushing 10 or 30 is carried out in the usual and customary manner.

While the above-described high performance iron alloy powders have been found useful and desirable in making the composite heavy-duty bushing of the present invention, it will be understood that other suitable high-performance alloy powders may also be used for the heavy-duty alloy sleeve 36.

The bevel 50 of FIGS. 1 and 3 which after forging becomes the bevel 20 of FIG. 4 and the bevel 42 of FIG. 5 provide an effective additional clinching of the inner and outer components 12 and 16 (FIG. 4) or 34 and 36 (FIG. 5). It has been found by actual tests, however, that the forging operation which results in the composite heavy-duty bushing 10 of FIG. 4 and 30 of FIG. 5 effects such an interlocking action at the respective interfaces 14 and 38 by the migration of the component materials across the interface that the above-mentioned bevels are not indispensable to prevent separation of the outer and inner component bushings but provide an additional safeguard therefor under the application of extremely heavy loads. This interlocking by migration of the metals across the respective interfaces 14 or 38 is clearly shown in the photomicrograph (FIG. 7).

I claim:

1. A composite heavy-duty bushing comprising
   — an inner sleeve composed of substantially solidified sintered powdered metallic material and having generally-cylindrical outer and inner surfaces,
   — an outer sleeve composed of a different substantially solidified sintered powdered metallic material and also having a generally-cylindrical outer surface and having a generally-cylindrical inner surface telescopingly engaging said outer surface of said inner sleeve and hot-forgedly joined thereto along a generally-cylindrical interface therebetween,
   — one of said sleeves being composed of a high-strength metallic material and the other sleeve being composed of a lower-strength base metallic material,
   — minute portions of one of said metallic materials extending irregularly past minute portions of the other of said metallic materials across said interface in interlocking engagement with one another and forming an approximately hollow cylindrical intermediate zone of the interflowed metallic materials encircling said interface,
   — said base metallic material being iron and said high-strength metallic material being a manganese-molybdenum iron alloy.

2. A composite heavy-duty bushing, according to claim 1, wherein said high-strength metallic material is a nickel-content manganese-molybdenum iron alloy.

3. A composite heavy-duty bushing, according to claim 1, wherein said high-strength material is a nickel-free manganese-molybdenum iron alloy.

4. A composite heavy-duty bushing, according to claim 1, wherein one of said sleeves has bevels extending toward the ends of said sleeves at the opposite ends of said generally-cylindrical interface and wherein the metallic material at both ends of the other sleeve extends transversely across said interface into abutting interflowed engagement with said bevels.

* * * * *